(12) United States Patent
Kurokami et al.

(10) Patent No.: US 6,320,769 B2
(45) Date of Patent: Nov. 20, 2001

(54) INTERCONNECTION POWER CONVERTER AND POWER GENERATION APPARATUS USING THE SAME

(75) Inventors: Seiji Kurokami, Kyoto; Naoki Manabe, Ibaraki; Nobuyoshi Takehara, Kyoto, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/725,819

(22) Filed: Nov. 30, 2000

(30) Foreign Application Priority Data

Dec. 1, 1999 (JP) .................................................. 11-341905

(51) Int. Cl.$^7$ .................................................. H02H 7/122
(52) U.S. Cl. .......................... 363/56.03; 323/906; 361/49
(58) Field of Search .................................. 363/55, 56.01, 363/56.02, 56.03, 56.04, 56.05, 98, 132; 323/225, 299, 235, 906; 361/42, 45, 49

(56) References Cited

U.S. PATENT DOCUMENTS

| | | | |
|---|---|---|---|
| 5,548,504 | 8/1996 | Takehara | 363/65 |
| 5,581,171 * | 12/1996 | Kerfoot et al. | 323/235 X |
| 5,592,074 | 1/1997 | Takehara | 363/131 |
| 5,669,987 | 9/1997 | Takehara et al. | 136/244 |
| 5,869,956 | 2/1999 | Nagao et al. | 323/299 |
| 5,892,354 | 4/1999 | Nagao et al. | 323/299 |
| 5,923,158 | 7/1999 | Kurokami et al. | 323/299 |

* cited by examiner

*Primary Examiner*—Jessica Han
(74) *Attorney, Agent, or Firm*—Fitzpatrick, Cella, Harper & Scinto

(57) ABSTRACT

In a solar power generation apparatus using a solar battery having a relatively large ground capacitor and a power conditioner having a non-insulated input and output, a customer's ground fault interrupter may perform unwanted interruption due to a ground fault outside the customer's premises. To prevent this, when a ground fault is detected by a detector capable of detecting a ground fault within a shorter time than the customer's ground fault interrupter, the gate of inverter of the power conditioner is blocked, a switch is changed to an open state, and the input voltage of inverter is held at a voltage value higher than the peak value of the alternate current voltage of a power system until at least the switch changes to the open state.

20 Claims, 8 Drawing Sheets

HALF-BRIDGE CIRCUIT

FULL-BRIDGE CIRCUIT

INTERCONNECTION POWER CONVERTER AND POWER GENERATION APPARATUS USING THE SAME

FIELD OF THE INVENTION

The present invention relates to a system interconnect power converter interconnected to a commercial power system (to be referred to as a "system" hereinafter) and a power generation apparatus using the same and, more particularly, to a power converter of insulated-transformerless type used in a power generation apparatus which comprises a direct current power supply such as a solar battery having a large ground capacitor and is interconnected to a low-voltage distribution system having one grounded line, and a power generation apparatus using the same.

BACKGROUND OF THE INVENTION

FIG. 2 is a block diagram showing the arrangement of a solar power generation apparatus interconnected to a low-voltage distribution system.

A solar battery array 1 is constituted by combining a plurality of solar battery modules serially/parallelly so as to obtain a desired output voltage and current. Direct current power output from the solar battery array 1 is input to a system interconnect power converter 2 (to be referred to as a "power conditioner" hereinafter) where the direct current power is converted into alternate current power. The output of the power conditioner 2 is connected to a low-voltage distribution system 4 via a customer's ground fault interrupter 3. A load 5 is connected between the power conditioner 2 and the customer's ground fault interrupter 3. Wiring inside the customer's premises is wiring from the customer's ground fault interrupter 3 to the power conditioner 2 and load 5. The customer's ground fault interrupter 3 detects a ground fault current to detect an electrical leakage inside the customer's premises, and interrupts the connection between the customer's equipment and the low-voltage distribution system 4 so as not to influence the low-voltage distribution system 4 outside the customer's premises.

The solar battery array 1 has a ground capacitor 6. As a solar battery module constituting the solar battery array 1, built-in modules and low-profile modules have recently been developed. In some cases, a conductive member (metal plate or the like) as a reinforcing member or a conductive member such as a metal plate as a base member covers a roof. In this case, a solar battery cell and metal plate face each other at a small interval with a large area, which increases the ground capacitor 6. If water attaches to the surface and any area of a solar battery module owing to rain or the like, the ground capacitor 6 is ocurred by the water.

On the other hand, most of the system interconnect power conditioners 2 recently adopt a so-called transformerless method having no insulated transformer in order to attain high efficiency, small size, light weight, and low cost.

The present inventors have found that when the ground capacitor 6 is large, the system interconnect power conditioner 2 is of transformerless type, and a ground fault occurs outside the customer's premises, the ground fault current flows through the ground capacitor 6 of the solar battery array 1 and the power conditioner 2 to cause unwanted interruption operation in the customer's ground fault interrupter 3. This unwanted interruption operation generated in the customer's ground fault interrupter 3 causes a power failure inside the customer's premises though no electrical leakage occurs inside the customer's premises.

This problem is not limited to the solar power generation system. The same problem arises in a power generation system using a fuel cell if the ground capacitor is large. A ground fault outside the customer's premises causes the customer's ground fault interrupter 3 to unnecessarily perform interruption operation, which may generate a power failure inside the customer's premises.

SUMMARY OF THE INVENTION

The present invention has been made to overcome the conventional drawbacks, and has as its object to prevent unwanted interruption operation of a customer's ground fault interrupter caused by a ground fault outside the consumer.

To achieve the object, a preferred embodiment of the present invention discloses a power converter for converting direct current power to alternate current power and supplying the alternate current power to a power system, said power converter comprising: a converter for boosting a voltage of direct current power supplied from a direct current power supply having a ground capacitor; an inverter for converting the direct current power supplied from said converter into alternate current power, wherein an input and output of said inverter are not insulated; a switch which is connected to an output terminal of said inverter and opens/closes an output of said power converter by a mechanical contact; a detector for detecting a ground fault within a shorter time than an operation time of a customer's ground fault interrupter interposed between said power converter and a power system having one grounded line; and a controller for controlling operations of said converter, said inverter, and said switch, wherein when said detector detects a ground fault, said controller changes said switch to an open state, blocks a gate of said inverter, and holds an output voltage of said converter to be higher than a peak value of an alternate current voltage of the power system until at least said switch changes to the open state.

Another preferred embodiment of the present invention discloses a power generation apparatus for supplying alternate current power to a power system and comprising a direct current power supply having a ground capacitor, and a power converter for converting direct current power into alternate current power, wherein said power converter comprises: a converter for boosting a voltage of direct current power supplied from the direct current power supply; an inverter for converting the direct current power supplied from said converter into alternate current power, wherein an input and output of said inverter are not insulated; a switch which is connected to an output terminal of said inverter and opens/closes an output of said power converter by a mechanical contact; a detector for detecting a ground fault within a shorter time than an operation time of a customer's ground fault interrupter interposed between said power converter and a power system having one grounded line; and a controller for controlling operations of said converter, said inverter, and said switch, wherein when said detector detects a ground fault, said controller changes said switch to an open state, blocks a gate of said inverter, and holds an output voltage of said converter to be higher than a peak value of an alternate current voltage of the power system until at least said switch changes to the open state.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A power generation apparatus according to preferred embodiments of the present invention will be described in detail below.

<First Embodiment>
[Arrangement of Power Generation Apparatus]

Figure 1:
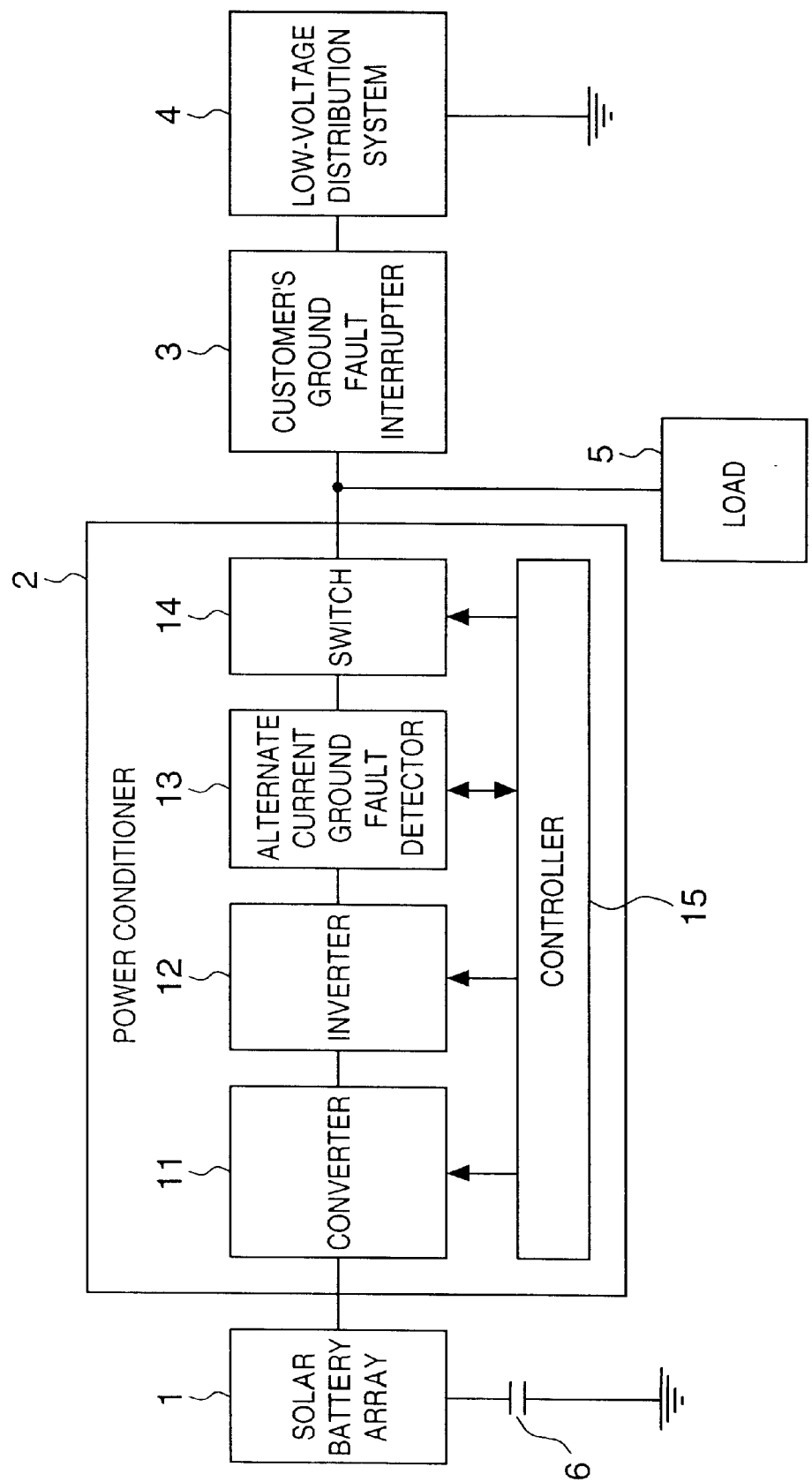
FIG. 1 is a block diagram showing the arrangement of a system interconnect solar power generation apparatus according to a preferred embodiment of the present invention.
Figure 2:
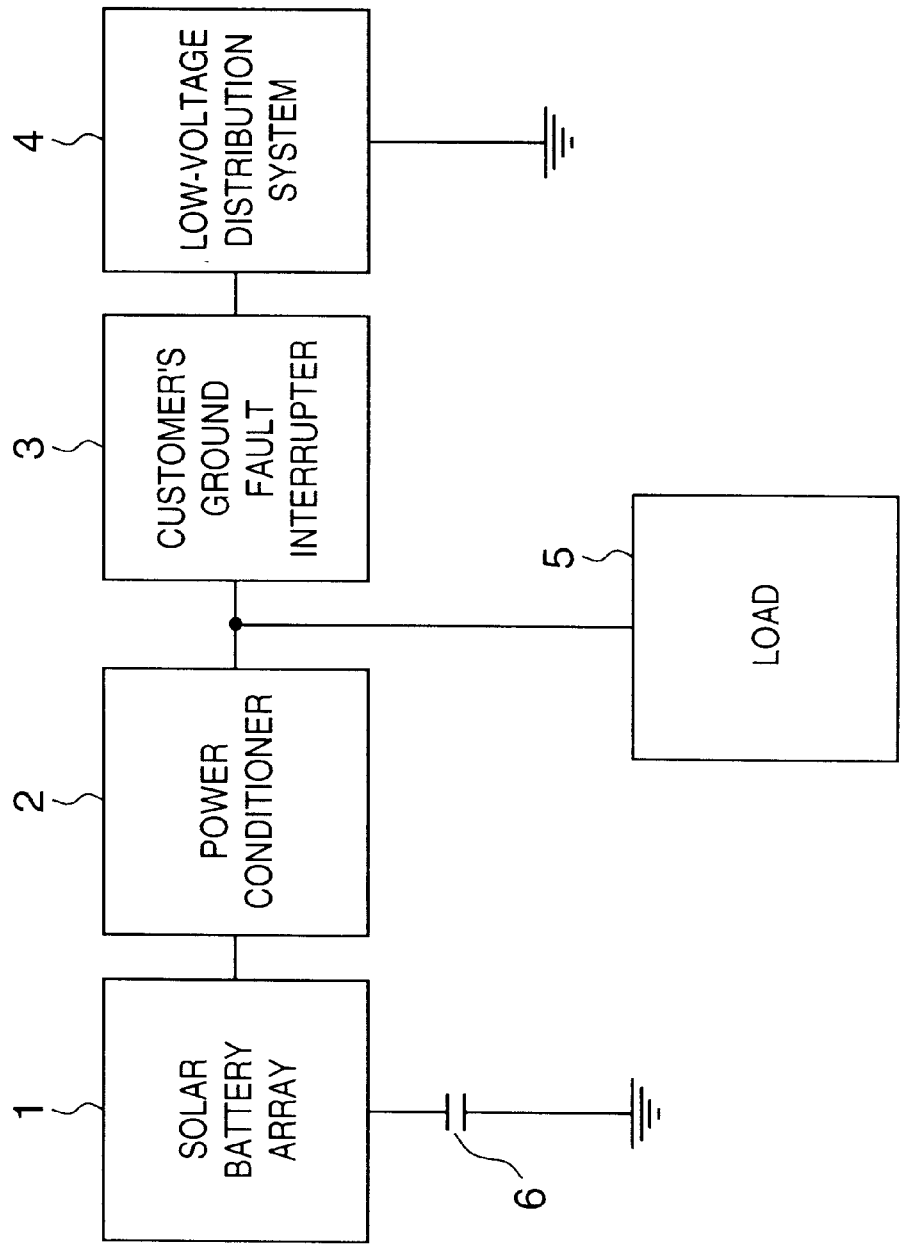
FIG. 2 is a block diagram showing the arrangement of a conventional system interconnect solar power generation apparatus.

FIG. 1 shows a preferred embodiment of the present invention. In FIG. 1, the same reference numerals as in FIG. 2 denote the same parts. The embodiment shown in FIG. 1 is different from the prior art shown in FIG. 2 in the internal arrangement of a system interconnect power conditioner 2.

The direct current power supply of a power generation apparatus according to the present invention is not particularly limited as far as the direct current power supply has a ground capacitor. A preferable direct current power supply is a solar battery (to be described later). This specification will exemplify a solar battery array.

A solar battery array 1 used as the direct current power supply of the power generation apparatus according to the present invention can use various arrangements. Instead of the array, one solar battery can be used as a direct current power supply. To generate large power, a solar battery array having a plurality of solar batteries is preferable.

The type of solar battery module constituting the array is not limited as far as the solar battery array 1 has a relatively large ground capacitor 6. A solar battery array 1 having a larger ground capacitor 6 exhibits a more enhanced effect of the present invention. The effect of the present invention is more enhanced when the solar battery array is constituted by solar battery modules in which solar battery cells are sealed with a resin on a metal reinforcing plate, solar battery modules constructed to contact a metal plate, or built-in solar battery modules.

The effect of the present invention can also be attained when the ground capacitor 6 is small in normal operation, but the ground capacitor 6 increases upon rainfall. When the metal reinforcing plate or metal plate is grounded, a stable ground capacitor exists. In this case, unwanted interruption readily occurs, and the effect of the present invention becomes prominent.

A low-voltage distribution system 4 suffices to have one grounded line, and is not limited in voltage, frequency, and wiring method (e.g., single-phase three-line method or three-phase three-line method). This embodiment constitutes a low-voltage distribution system 4 of single-phase three-line type using 100 V/200 V and 60 Hz. The present invention can also be applied when a single-phase three-line type system is formed by V connection.

The system interconnect power conditioner 2 is comprised of a converter 11, inverter 12, alternate current ground fault detector 13, switch 14, and controller 15.

In normal running operation, the converter 11 boosts direct current power from the solar battery array 1 to a voltage necessary for the inverter 12 (value higher than the peak value of the voltage of the low-voltage distribution system 4). The inverter 12 converts direct current power from the converter 11 into alternate current power.

The converter 11 and inverter 12 are made up of switching elements formed by inversely parallel-connecting self-interrupting semiconductor elements and freewheeling diodes, and can adjust the boosting ratio, power flow, frequency, and the like in accordance with their switching operations. The converter 11 and inverter 12 do not have any transformers, and their inputs and outputs are not insulated. In other words, the power conditioner 2 is of so-called transformerless type.

Figure 8B:
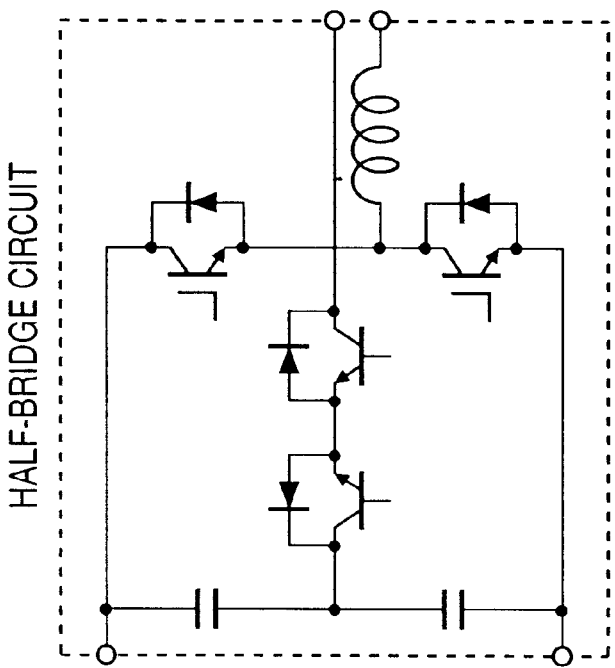
FIGS. 8A and 8B are circuit diagrams each showing the arrangement of the inverter of the power conditioner according to the present invention.
Figure 8A:
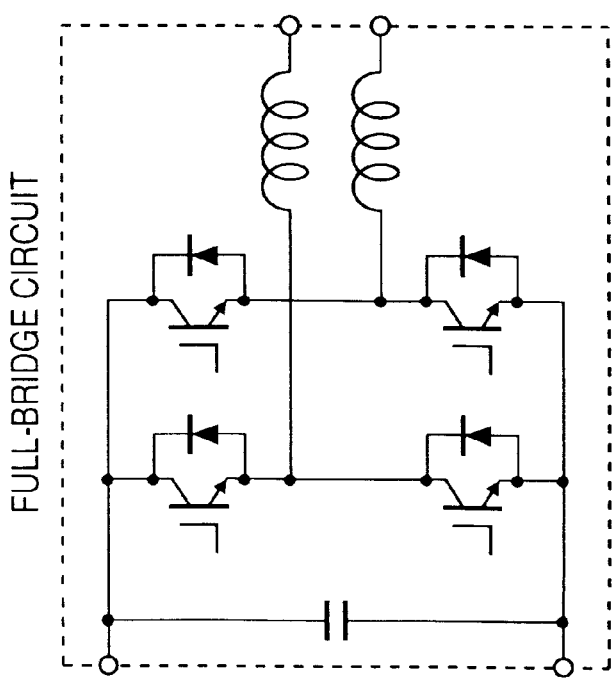

The inverter 12 is preferably a circuit in which the impedance becomes high between the input and the output when all the switching elements are turned off. For example, a full-bridge circuit in FIG. 8A is preferable. When a half-bridge circuit is used, a switching element is added to a phase connected to the intermediate point between two series-connected capacitors, as shown in FIG. 8B. For a high impedance of a level at which the current is substantially negligible, a resistor, capacitor, or the like may be connected between the input and output of the inverter 12.

The alternate current ground fault detector 13 may detect a zero-phase current or variations in ground voltage so long as it detects a ground fault. In addition to detection of a zero-phase current, the alternate current ground fault detector 13 more preferably detects the phase difference between a zero-phase current and a zero-phase voltage, and detects a ground fault in consideration of the phase difference. The alternate current ground fault detector 13 of the same type as a customer's ground fault interrupter 3 facilitates the design because no difference in detection method need be considered. The position of the alternate current ground fault detector 13 is not limited to the one shown in FIG. 1, and can be arbitrarily set as far as the ground fault detection scheme functions.

A preferable example of the switch 14 is an electromagnetic switch or relay having a mechanical contact. In general, the mechanical contact operates slower than the switching operation of a semiconductor.

The controller 15 is connected to the converter 11, inverter 12, alternate current ground fault detector 13, and switch 14. The controller 15 controls the whole operation of the system interconnect power conditioner 2, and performs various protective functions, switching control, MPPT (Maximum Power Point Tracking) control, start/stop control, and the like. The controller 15 controls switching of the converter 11 and inverter 12. In addition, the controller 15 receives a ground fault detection signal from the alternate current ground fault detector 13 to control the opening/closing of the switch 14.

The controller 15 can be formed from an analog circuit and a digital circuit including a CPU, DSP, memory, and I/O. In recent years, CPUs and DSPs are achieving higher performance and lower cost. A controller 15 using such CPU and DSP can realize various control operations by software, and attains a small size, low cost, and high degree of freedom.

The power conditioner 2 further requires a voltage detector, current detector, and circuit for driving the gate of a switching element (none of them are shown), but a description thereof will be omitted because general-purpose ones can be used.

The customer's ground fault interrupter 3 normally detects a zero-phase current to detect a ground fault. In general, the sensitivity current (and non-operation current) and detection time with respect to an electrical leakage are specified. The arrangement of the customer's ground fault interrupter 3 is properly selected in accordance with a load 5 and solar power generation apparatus inside the customer's premises.

The detection conditions of the alternate current ground fault detector 13 according to this embodiment must be set to detect a ground fault faster than the customer's ground fault interrupter 3. The detection conditions include, e.g., the detection level and detection time. The detection level is set to a sensitivity value equal to or higher that of the customer's ground fault interrupter 3. The detection time is set shorter than that of the customer's ground fault interrupter 3.

If a ground fault occurs outside the customer's premises using this solar power generation apparatus, in other words, on a side nearer the low-voltage distribution system 4 than the customer's ground fault interrupter 3, a ground fault current flows passing through the ground fault point and the contact of the low-voltage distribution system 4. Since the low-voltage distribution system 4 has a grounding resistance, a voltage drop is occurred by the ground fault current, and then a voltage between the low-voltage distribution system 4 and the ground is varied. In running the power conditioner 2, the ground fault current passes through not only the contact of the low-voltage distribution system 4 but also the ground capacitor 6 because the input and output of the power conditioner 2 are not insulated, and the solar battery array 1 has the relatively large ground capacitor 6. In the following description, "the ground fault current enters" means that the ground fault current flows through the solar battery power generation apparatus via the ground capacitor 6. Note that the magnitude of the ground fault current flowing through the ground capacitor 6 depends on the state of the ground fault, the impedance of the current path determined by the wiring of the low-voltage distribution system 4, the ground capacitor 6, and the like, and the voltage of the low-voltage distribution system 4.

When the alternate current ground fault detector 13 detects a ground fault current entering the solar power generation apparatus, the controller 15 immediately blocks the gate of the inverter 12, and opens the switch 14. Until the switch 14 is opened, the input voltage of the inverter 12 is held at a value higher than the peak value of the alternate current voltage of the low-voltage distribution system 4, thereby inhibiting entrance of the ground fault current.

The switch 14 operates slower than the gate block because of the mechanical contact. Until the switch 14 is opened, the switching element of the inverter 12 is turned off by the gate block. If the input voltage of the inverter 12 becomes lower than the peak value of the voltage of the low-voltage distribution system 4, the freewheeling diode of the switching element in the inverter 12 is turned on to allow entrance of the ground fault current. To prevent this, the input voltage of the inverter 12 is held at a value higher than the peak value of the alternate current voltage of the low-voltage distribution system 4 until at least the switch 14 is opened, thereby inhibiting the ON operation of the freewheeling diode and reliably inhibiting entrance of the ground fault.

Accordingly, before the customer's ground fault interrupter 3 detects the ground fault current passing through the ground capacitor 6, entrance of the ground fault current can be reliably inhibited to prevent unwanted interruption operation of the customer's ground fault interrupter 3.

As a method of holding the input voltage of the inverter 12 at a value higher than the peak value of the voltage of the low-voltage distribution system 4, e.g., the converter 11 is kept boosted even after the gate of the inverter 12 is blocked, or a capacitor having a sufficient electrostatic capacitance is connected to the input terminal of the inverter 12.

When a ground fault occurs inside another customer, the customer's ground fault interrupter of that customer generally operates to disconnect the ground fault portion, and the low-voltage distribution system 4 returns to a normal state. Hence, the power conditioner 2 which has stopped to inhibit entrance of the ground fault current resumes running a predetermined time after stop. When, however, the detection sensitivity of the customer's ground fault interrupter of the other customer is low, or a ground fault portion is on the system side (outside all customers which receive supply of power from the low-voltage distribution system 4), the ground fault portion may not be disconnected from the system. Even in this case, this embodiment can prevent unwanted interruption operation of the customer's ground fault interrupter 3 in resuming running the power conditioner 2.

[Power Conditioner]

The system interconnect power conditioner 2 according to the present invention will be explained in detail with reference to the accompanying drawings.

Figure 3:
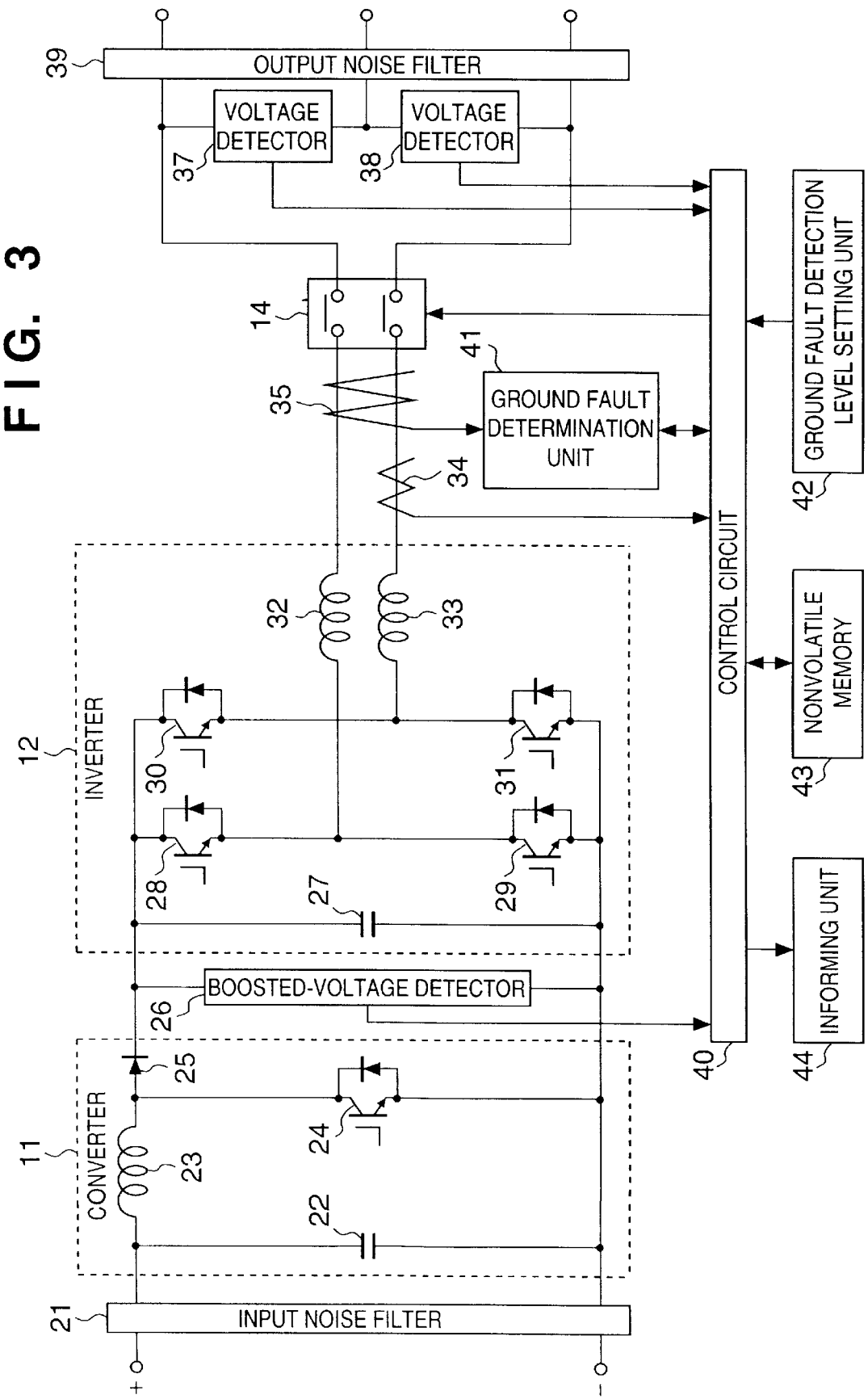
FIG. 3 is a block diagram showing the arrangement of a power conditioner according to the first embodiment.

FIG. 3 is a block diagram showing the arrangement of the system interconnect power conditioner according to the present invention.

Reference numeral 21 denotes an input noise filter for preventing noise from flowing into the solar battery array 1. Reference numeral 22 denotes a smoothing capacitor; 23, a boosting reactor; 24, a switching element formed by inversely parallel-connecting a self-interrupting semiconductor element and protective diode for a boosting chopper; and 25, a backflow prevention diode. The smoothing capacitor 22, boosting reactor 23, switching element 24, and backflow prevention diode 25 constitute a boosting chopper (boosting circuit). The smoothing capacitor 22 and boosting chopper constitute the converter 11.

The output voltage of the boosting chopper is controlled to be constant at 320 V higher than a 282-V peak value of a 200-V alternate current voltage of the low-voltage distribution system 4. When the power conditioner is interconnected to a low-voltage distribution system of 100 V, the boosted voltage is controlled to be constant at, e.g., 160 V higher than a peak value of 141 V. The boosted voltage need not be constant as long as the output can be stably controlled at a boosted voltage higher than the peak value of the system voltage.

Reference numeral 26 denotes a boosted-voltage detector for detecting a boosted voltage to output a boosted-voltage signal.

Reference numeral 27 denotes a smoothing capacitor for smoothing the input voltage of the inverter 12; 28 to 31, switching elements which are formed by inversely parallel-connecting self-interrupting semiconductor elements and freewheeling diodes and constitute a full-bridge circuit. The output of the full-bridge circuit is connected to interconnected reactors 32 and 33. The smoothing capacitor 27, switching elements 28 to 31, and interconnected reactors 32 and 33 constitute the inverter 12.

Reference numeral 34 denotes an output current detector for detecting the output current of the inverter 12 to output an output current detection signal. A control circuit 40 controls an output based on the output current detection signal. Reference numeral 35 denotes a zero-phase current detector for detecting currents through the output lines of the inverter 12 at once, and outputting a zero-phase current detection value; and 41, a ground fault determination unit.

The ground fault determination unit 41 has ground fault determination conditions set by a determination condition signal input from the control circuit 40, receives a zero-phase current detection value from the zero-phase current detector 35, determines a ground fault in accordance with the set ground fault determination conditions, and outputs a ground fault detection signal. In this embodiment, the ground fault determination unit 41 is comprised of a level comparator for comparing the magnitude of a zero-phase current detection value, and a timer capable of counting a predetermined time. The level comparator and timer can be implemented by a known analog or digital circuit. If they are formed from a digital circuit, they can share hardware with the control circuit 40 (to be described later).

The switch 14 uses a relay to mechanically open/close the contact with the low-voltage distribution system 4. Reference numerals 37 and 38 denote alternate current voltage detectors for detecting the voltages of respective phases of the low-voltage distribution system 4, and outputting alternate current voltage detection signals; and 39, an output noise filter for preventing noise from flowing into the load 5 and low-voltage distribution system 4.

The control circuit 40 receives the boosted-voltage signal, the output current detection signal, the alternate current voltage detection signal, and a ground fault detection signal (to be described later). Based on the boosted-voltage signal, the control circuit 40 adjusts the ON/OFF ratio (duty) of the switching element 24 so as to keep the boosted voltage to be constant at 320 V higher than a 282-V peak value of the voltage of the low-voltage distribution system 4 in order to stably control an output. Further, the control circuit 40 controls the opening/closing of the switch 14. That is, the control circuit 40 controls the whole power conditioner 2 including an operation concerning this embodiment. The control circuit 40 has a timer capable of counting a predetermined time. This timer can be used as the timer of the ground fault determination unit 41.

Reference numeral 42 denotes a ground fault detection level setting unit for setting ground fault detection conditions outside the power conditioner 2, and outputting a setting condition signal. Ground fault detection conditions are set such that the detection sensitivity and detection time can be set, and a ground fault current can be detected within a shorter time than the customer s ground fault interrupter 3 on the basis of the detection sensitivity and detection time of the customer's ground fault interrupter 3 used in the customer's premises.

Figure 5:
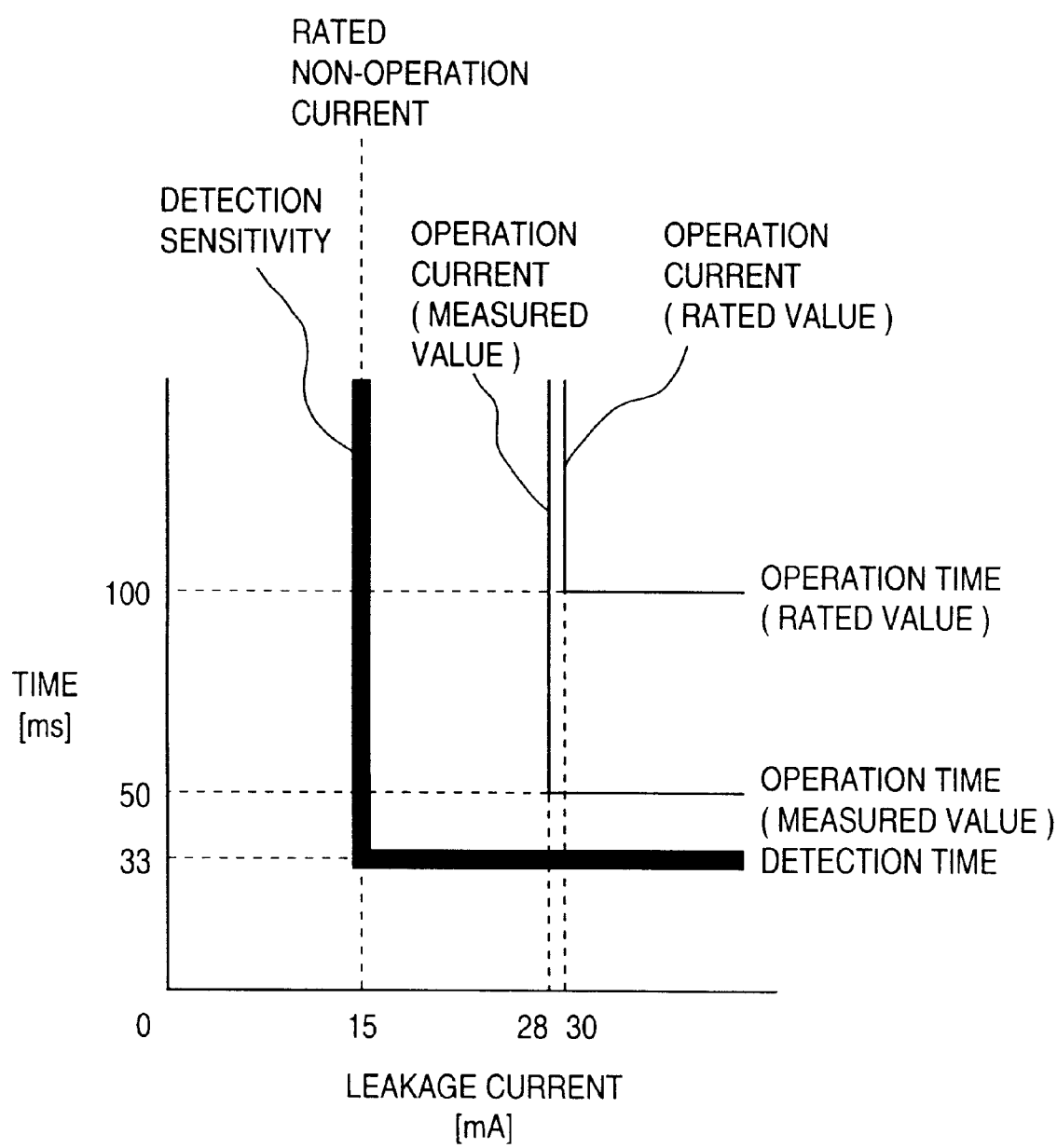
FIG. 5 is a graph showing the detection conditions of the power conditioner according to the first embodiment.

FIG. 5 is a graph showing the relationship between the detection characteristics of the customer's ground fault interrupter 3 and the detection conditions of the ground fault detection level setting unit 42. The abscissa represents the leakage current, and the ordinate represents time. The customer's ground fault interrupter 3 used in this embodiment has a rated operation current of 30 mA, a rated non-operation current of 15 mA, and a rated operation time of 100 ms. A current was flowed through the customer's ground fault interrupter 3, and conditions under which the customer's ground fault interrupter 3 actually operated were measured to find that the operation current was 28 mA and the operation time was 50 ms.

Since the rated non-operation current of a general ground fault interrupter is determined, setting almost the same detection sensitivity enables the customer's ground fault interrupter 3 to reliably detect a ground fault at a higher sensitivity than the general ground fault interrupter. This embodiment sets a detection sensitivity of 15 mA. Alternatively, the detection sensitivity may be set to a value close to the measured value of the operation sensitivity of the ground fault interrupter. Note that if the detection sensitivity is set too high, the customer's ground fault interrupter 3 may detect a leakage current which is generated in normal running operation and passes through the ground capacitor 6. Thus, an operation sensitivity with a margin for the leakage current passing through the ground capacitor 6 should be set.

The detection time must be set shorter than the measured value of the operation time of the customer's ground fault interrupter 3. Since the measured value of the operation time of the customer's ground fault interrupter 3 was 50 ms, this embodiment sets $\frac{2}{3}$ the measured value, i.e., 33 ms. If the detection time is too short, the customer's ground fault interrupter 3 may erroneously detect a transient phenomenon, so that a time of about several ten ms is desirable. Even with the use of a time delay type ground fault interrupter, the detection time is set shorter than the measured value of the operation time. If the detection time is set to about several ten to hundred ms, the margin for the operation time increases to improve the reliability of preventing unwanted interruption operation of the customer's ground fault interrupter 3.

The ground fault detection level setting unit 42 comprises switches for setting the detection sensitivity and detection time, and selects conditions assigned to these switches. The ground fault detection level setting unit 42 can take various arrangements other than the above-described one. For example, the ground fault detection level setting unit 42 may adopt a switch for incrementing/decrementing set parameters while referring to set parameters displayed on the display.

In FIG. 3, reference numeral 43 denotes a nonvolatile memory from/in which the control circuit 40 can read/write information, and at least detection of a ground fault is recorded. An example of the nonvolatile memory 43 is a combination of a flash memory, an EEPROM, a backup power supply such as a battery or electric double layer capacitor, and a SRAM. Some CPUs incorporate flash memories and EEPROMs. Using such a CPU can downsize and simplify the nonvolatile memory 43.

Reference numeral 44 denotes an alarm unit used by the control circuit 40 to inform at least detection of a ground fault. The type of alarm unit 44 includes a method of informing detection of a ground fault by sound using a buzzer or speaker, and a method of informing it by light using an LED or liquid crystal. In addition to the presence/absence of sound or light, the alarm unit 44 may display information by speech, characters, and symbols. Alternatively, the alarm unit 44 may transmit information to the outside of the customer's premises such as an electric power company via a communication means.

Although not shown, a driving circuit for driving each switching element, and a control power supply for supplying power to the control circuit 40 or the like are also necessary.

The control circuit 40 receives various signals from the input and output sides of the power conditioner 2. However, these signals must be insulated from both or at least one of the input and output.

[Ground Fault Detection Operation]

Ground fault detection operation of the power conditioner 2 will be explained.

Figure 4:
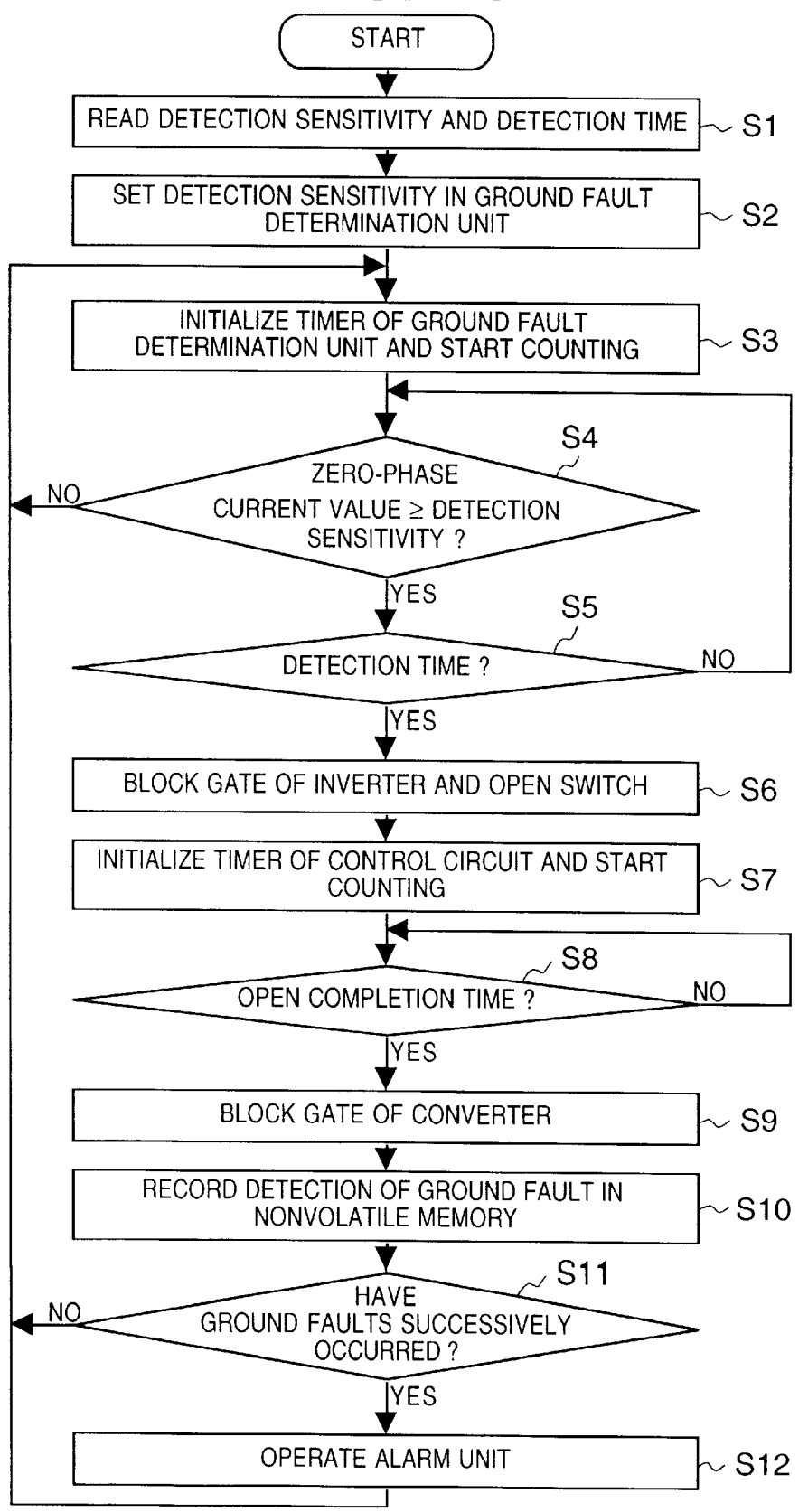
FIG. 4 is a flow chart showing detection operation of the power conditioner according to the first embodiment.

FIG. 4 is a flow chart showing ground fault detection operation of the power conditioner 2 that is executed by the control circuit 40.

In step S1, the control circuit 40 reads the detection sensitivity and detection time of ground fault detection from the ground fault detection level setting unit 42. In step S2, the control circuit 40 sets the read detection sensitivity as the reference value of the level comparator of the ground fault determination unit 41. In step S3, the control circuit 40 initializes the timer of the ground fault determination unit 41, and starts counting.

In step S4, the control circuit 40 acquires the comparison result between a zero-phase current detection value and the detection sensitivity by the level comparator of the ground fault determination unit 41. If the zero-phase current detection value<the detection sensitivity, the control circuit 40 determines no ground fault state, and returns to step S3. In other words, the control circuit 40 repeats steps S3 and S4 while the zero-phase current detection value is smaller than the detection sensitivity. If the zero-phase current detection value≧the detection sensitivity, the control circuit 40 determines the possibility of a ground fault, and advances to step S5.

In step S5, the control circuit 40 acquires the count value of the timer of the ground fault determination unit 41. If a time represented by the count value<the detection time, the control circuit 40 returns to step S4. That is, even if the zero-phase current detection value is larger than the detection sensitivity, the control circuit 40 repeats steps S4 and S5 while the count value of the timer is smaller than the detection time. If the time represented by the count value of the timer≧the detection time, the control circuit 40 determines a ground fault, and shifts to step S6.

In step S6, the control circuit 40 blocks the gate of the inverter 12, opens the switch 14, and stops an alternate current output. Note that switching operation of the converter 11 is maintained to set the output voltage to a predetermined voltage.

In step S7, the control circuit 40 initializes its timer, and starts counting.

In step S8, the control circuit 40 determines from the count value of its timer whether a time by which the switch 14 is reliably opened (to be referred to as an "open completion time" hereinafter) or longer has elapsed. If NO in step S8, the control circuit 40 repeats step S8.

If YES in step S8, the control circuit 40 blocks the gate of the converter 11 in step S9. Accordingly, running stop operation of the power conditioner 2 is completed.

In step S10, the control circuit 40 records detection of the ground fault in the nonvolatile memory 43. Detection of the ground fault including data representing the detection time and date, power generation amount, and zero-phase current detection value is recorded in the nonvolatile memory 43, which can be used as a reference in investigating the cause of the stop of the power conditioner 2 later.

In step S11, the control circuit 40 determines whether ground faults have successively occurred. If NO in step S11, the control circuit 40 returns to step S3; or if YES in step S11, shifts to step S12 to operate the alarm unit 44 to inform the customer's premises of generation of ground faults. Then, the control circuit 40 returns to step S3 to repeat the above operation.

Generation of successive ground faults can be determined by various methods. For example, the following method can be employed.

A flag is prepared, and normally reset. When a ground fault is detected, the flag is set, and is reset a predetermined time after detection of a ground fault. Hence, if a ground fault is detected again while the flag is set, successive ground faults are determined. As another method, the number of detected ground faults may be counted. Alternatively, whether successive ground faults occur may be determined using data representing the detection time and date recorded in the nonvolatile memory 43. By processing detection of ground faults a plurality of number of times by a predetermined method, whether ground faults successively occur can be known.

Although an operation after recording of ground fault detection or informing operation is not shown, the control circuit 40 determines after a predetermined time that the ground fault state is canceled, stops informing operation, and resumes running the power conditioner 2. Alternatively, for example, running of the power conditioner 2 may be resumed by a manual operation, and informing operation continues till the manual operation.

By the above operation, entrance of a ground fault current can be reliably inhibited within a short time to prevent unwanted interruption operation of the customer's ground fault interrupter 3. More specifically, as described above, the ground fault current is detected within a short time, the gate of the inverter 12 is blocked, and the switch 14 is opened. At the same time, the operation of the converter 11 is maintained to hold the input voltage of the inverter 12 at a value larger than the peak value of the alternate current voltage of the low-voltage distribution system 4. After the switch 14 is reliably opened, the gate of the converter 11 is blocked. Thus, the ground fault current entering via the ground capacitor 6 of the solar battery array 1 can be reliably inhibited within a short time to prevent unwanted interruption operation of the customer's ground fault interrupter 3.

Since a semiconductor switch such as a fast-operation solid state relay (SSR) need not be added to each phase of the low-voltage distribution system 4, a solar power generation apparatus can be constituted at a low loss and low cost.

Since ground fault detection conditions can be externally set, they can be adjusted in accordance with the characteristics of the customer's ground fault interrupter 3 installed in the customer's premises. This enables ground fault detection copying with the characteristics of the customer's ground fault interrupter 3, resulting in a high effect of preventing unwanted interruption operation of the customer's ground fault interrupter 3 can be enhanced.

Recording detection of a ground fault in the nonvolatile memory 43 makes it easy to investigate the cause of the stop of the power conditioner 2 later. The ground fault detection time and date, zero-phase current detection value, power generation amount, and the like are preferably recorded together.

If the customer is informed of detection of a ground fault, the customer can know generation of a ground fault outside the customer's premises, and can take a measure of canceling the ground fault outside the customer's premises or minimizing damage caused by a power failure.

By detecting a plurality of alternate current ground faults, whether alternate current ground faults successively occur can be determined. The power conditioner 2 is controlled in accordance with whether alternate current ground faults successively occur, thereby realizing a more appropriate operation. In particular, the customer's premises who is informed of generation of successive alternate current ground faults can take a more reliable measure.

<Second Embodiment>

The second embodiment will be described. The arrangement of the second embodiment is almost the same as that of the first embodiment except for the following points.

A ground fault detection level setting unit 42 similarly sets the detection time, but does not set any detection sensitivity. Setting of the detection sensitivity can be instructed to a control circuit 40 by a switch which is arranged in the ground fault detection level setting unit 42 and directs a detection sensitivity setting mode.

The control circuit 40 has a function of setting a detection sensitivity corresponding to a solar battery array 1, more specifically, to a ground capacitor 6 upon reception of a detection sensitivity setting command from the ground fault detection level setting unit 42. When the control circuit 40 does not receive any detection sensitivity setting command, it performs the same operation as in the first embodiment. The detection sensitivity setting function will be explained.

Figure 6:
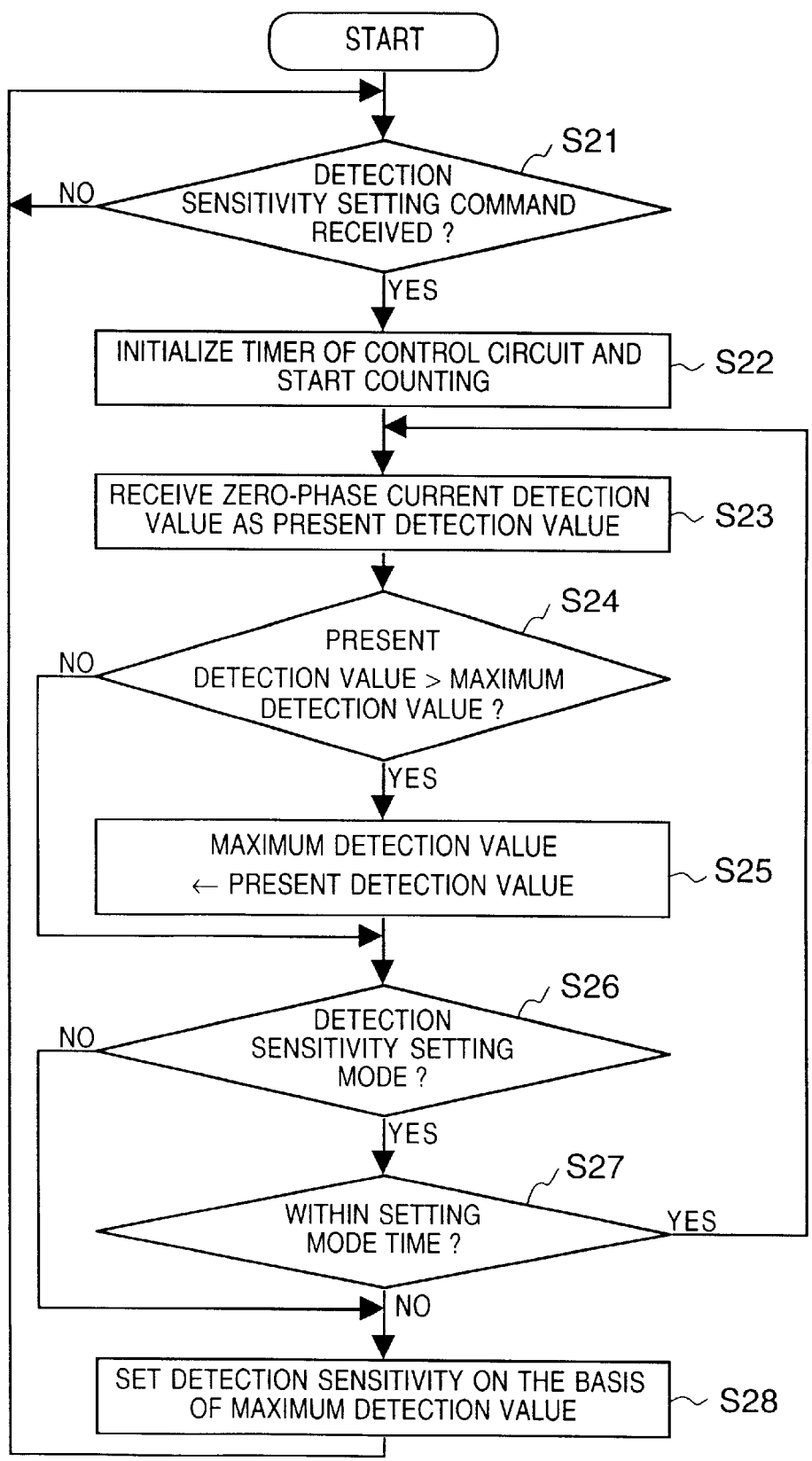
FIG. 6 is a flow chart concerning setting of the detection sensitivity of a power conditioner according to the second embodiment.

FIG. 6 is a flow chart showing detection sensitivity setting operation which is executed by the control circuit 40.

If the control circuit 40 receives a detection sensitivity setting command in step S21 (YES), it advances to step S22 to shift to the detection sensitivity setting mode. If NO in step S21, the control circuit 40 repeats step S21.

In step S22, the control circuit 40 initializes its timer in order to count the time after the detection sensitivity setting mode is set, and starts counting. In step S23, the control circuit 40 receives a zero-phase current detection value from a zero-phase current detector 35 as a present detection value. In step S24, the control circuit 40 compares the present detection value with the maximum value of the past detection value (to be referred to as a "maximum detection value" hereinafter). If the present detection value is larger, the control circuit 40 advances to step S25 to update the maximum detection value to the present detection value. In step S26, the control circuit 40 checks whether the detection sensitivity setting mode is set. If YES in step S26, the control circuit 40 advances to step S27; and if NO, to step S28.

In step S27, the control circuit 40 refers to the count value of the timer to check whether the time falls within the setting mode time. If YES in step S27, the control circuit 40 returns to step S23 to repeat the operation from steps S23 to S26. If NO in step S27, the control circuit 40 advances to step S28.

In step S28, the control circuit 40 sets a detection sensitivity on the basis of the maximum detection value obtained by the above operation. For example, the control circuit 40 sets a value four times the maximum detection value as the detection sensitivity. After this setting, the operation returns to step S21.

With the above operation, the control circuit 40 can detect the maximum value of a leakage current in a normal state, i.e., a current passing through the ground capacitor 6 in a normal state, thus setting a detection sensitivity corresponding to the solar battery array 1. Although the setting mode time is arbitrary, too long a time is meaningless, and too short a time decreases the reliability of the maximum value of a detected leakage current. In general, the setting mode time is set to about several to 10 min.

A transformerless type power conditioner 2 was connected to a 4-kW solar battery array 1, the detection sensitivity was set on a clear day, and the solar battery array 1 was operated to find a maximum detection value of 3.1 mA. From this, the detection sensitivity was set to 12.4 mA. This detection sensitivity has a sufficient margin for the actual operation sensitivity of a general customer's ground fault interrupter 3, and can prevent unwanted interruption operation of the customer's ground fault interrupter 3. Since the detection sensitivity is set four times the maximum detection value, it also has a margin for a leakage current flowing through the ground capacitor 6 in a normal state, and can suppress erroneous stop of the power conditioner 2.

In this manner, a detection sensitivity corresponding to the solar battery array 1 can be set by measuring a leakage current in a normal state, and setting the detection sensitivity on the basis of the maximum value. Unwanted interruption operation of the customer's ground fault interrupter 3 can be prevented, and erroneous stop of the power conditioner 2 can be suppressed.

In the above description, the detection sensitivity is set four times the maximum detection value on a clear day. However, the detection sensitivity is not limited to this, and can be arbitrarily set. Alternatively, a plurality of detection sensitivity setting methods may be adopted and selected. Depending on the type of solar battery module, the influence of increasing a leakage current on a rainy day is large. In this case, it is desirable to set the detection sensitivity on a rainy data or set a large magnification.

In general, the leakage current in a normal state is proportional to the output from the power conditioner 2. Considering this, the maximum detection value is multiplied by a ratio Pr/Po of an output Po from the power conditioner 2 when the maximum detection value is obtained, and a rated maximum output Pr from the power conditioner 2, thereby calculating a maximum detection value converted into the rated maximum output from the power conditioner 2. The detection sensitivity can be set based on this maximum detection value to suppress the influence of the magnitude of an output from the power conditioner 2.

The detection sensitivity setting function is not only operated by a manual operation but also always operated in normal running operation. The maximum detection values of leakage currents can be obtained in various situations, and the detection sensitivity can be more properly set. In this case, a current entering upon a ground fault outside the customer's premises and a leakage current in a normal state must be discriminated. For example, when the detection value abruptly increases, an output from the power conditioner 2 is decreased, and whether the detection value decreases in accordance with the decrease in output is checked.

The detection sensitivity setting function in the second embodiment and manual setting of the detection sensitivity in the first embodiment may be adopted together. For example, a lower one of the two detection sensitivities is set as an actual detection sensitivity. When a detection sensitivity value by the detection sensitivity setting function exceeds a manually set detection sensitivity value, the user is informed of these detection sensitivity values so as to check them. This can increase the reliability of preventing unwanted interruption operation of the customer's ground fault interrupter 3, and can suppress erroneous stop of the power conditioner 2.

<Third Embodiment>

The arrangement of the third embodiment is almost the same as those of the first and second embodiments except for the detection sensitivity setting method.

In running a power conditioner 2, a control circuit 40 of the third embodiment receives a zero-phase current detection value from a zero-phase current detector 35. At the same time, the control circuit 40 receives output power from the power conditioner 2, and holds as a maximum detection value the maximum value of the zero-phase current detection value every output power (e.g., 0.1 kW pitch). On the basis of the held maximum detection value, the control circuit 40 sets a detection sensitivity corresponding to output power from the power conditioner 2 at that time in a ground fault determination unit 41.

Figure 7:
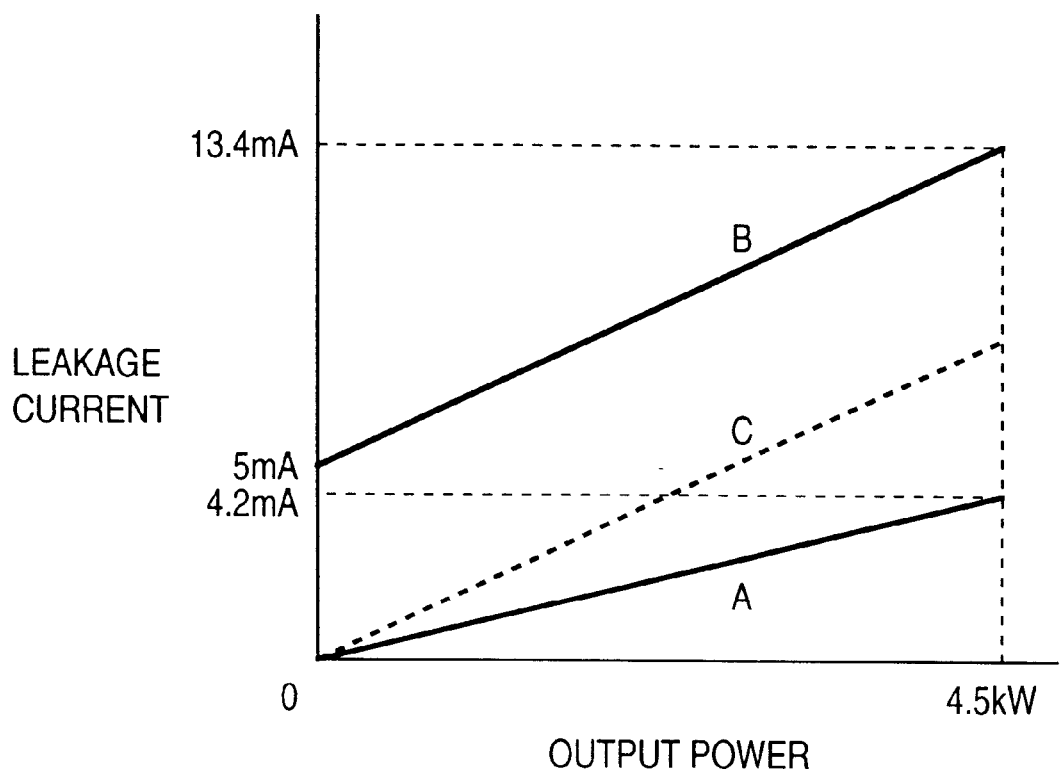
FIG. 7 is a graph showing the detection conditions of the power conditioner according to the second embodiment.

FIG. 7 is a graph showing the maximum detection value and detection sensitivity when a power conditioner 2 having a maximum output of 4.5 kW is connected to a 4.5-kW solar battery array 1. The abscissa represents the output power, and the ordinate represents the zero-phase current detection value. A solid line A shown in FIG. 7 represents the maximum detection value, and a solid line B represents the set value of the detection sensitivity. The maximum detection value A is proportional to output power. For output power of 4.5 kW, the maximum detection value was 4.2 mA. The set value B of the detection sensitivity is obtained by doubling the maximum detection value A (broken line C shown in FIG. 7) and adding 5 mA. Doubling sets a margin, and adding 5 mA ensures a margin for a small output.

By setting a detection sensitivity corresponding to output power in this fashion, unwanted interruption operation of a customer's ground fault interrupter 3 and erroneous stop of the power conditioner 2 can be prevented. This effect is enhanced when an output from the power conditioner 2 is small. More specifically, a current value smaller than an operation current value interrupted by the customer's ground fault interrupter 3 is set as the detection sensitivity to prevent unwanted interruption of the customer's ground fault interrupter 3. If the detection sensitivity is set low, unwanted interruption of the customer's ground fault interrupter 3 hardly occurs, but the power conditioner 2 erroneously stops at high possibility. For this reason, as there is a proportional relationship between a leakage current via the ground capacitor 6 and an output from the power conditioner 2, the detection sensitivity is made to be proportional to an output from the power conditioner 2. This can prevent both unwanted interruption operation of the customer's ground fault interrupter 3 and erroneous stop of the power conditioner 2.

The detection sensitivity calculation method of the third embodiment is not limited to the above one, and can be properly set. A plurality of calculation methods may be employed.

The detection sensitivity setting function may be manually operated. Since the detection sensitivity can be set while the situation is checked, the influence of a ground fault outside the customer's premises can be easily determined.

The detection sensitivity setting function in the third embodiment and setting of the detection sensitivity in the first embodiment can be used together. For example, a smaller one of detection sensitivity values set by the two means is set as an actual detection sensitivity. When a detection sensitivity value by the detection sensitivity setting function exceeds a manually set detection sensitivity value, the user is informed of these detection sensitivity values so as to check them. This can increase the reliability of preventing unwanted interruption operation of the customer's ground fault interrupter 3, and can suppress erroneous stop of the power conditioner 2.

The second and third embodiments may adopt a detection sensitivity confirmation unit for displaying a set detection sensitivity value. In this case, the constructor of a solar power generation apparatus can confirm whether the detection sensitivity to the customer's ground fault interrupter 3 is appropriate. Note that the detection sensitivity confirmation unit may be commonly used as the alarm unit 44, which can decrease the cost.

If the ground fault determination unit 41 not only detects a zero-phase current but also determines a ground fault using the phase difference between the zero-phase current and the ground voltage, whether a failure occurs on the input-side circuit of the power conditioner 2 can be determined to suppress erroneous detection.

If the ground fault determination unit 41 detects variations in ground potential to determine a ground fault, a ground fault can be detected even when the power conditioner 2 stops. The power conditioner 2 can resume running after the ground fault state is reliably canceled.

In reactivating the power conditioner 2 after a ground fault is detected once, unwanted operation under the influence of a transient leakage current is prevented by holding an output in a zero state for a time longer than the detection time of the customer's ground fault interrupter 3 after the switch 14 is turned on. A ground fault can be detected with a small leakage current by gradually increasing the output. Hence, unwanted operation of the customer's ground fault interrupter 3 can be reliably prevented.

As described above, the system interconnect power conditioner 2 in each of the above-described embodiments detects generation of a ground fault outside the customer's premises within a short time before the customer's ground fault interrupter 3 performs interruption. The gate of inverter is immediately blocked, the switch 14 is opened, and the input voltage of the inverter is held to be higher than the peak value of the alternate current voltage of the system 4. A ground fault current entering the power conditioner 2 is instantaneously, reliably interrupted to prevent unwanted interruption operation of the customer's ground fault interrupter 3. This can avoid a power failure in the customer's premises caused by the ground fault outside the customer's premises. Since a semiconductor switch such as an SSR need not be added to each phase, the power conditioner 2 can be constituted at a low loss and low cost.

As many apparently widely different embodiments of the present invention can be made without departing from the spirit and scope thereof, it is to be understood that the invention is not limited to the specific embodiments thereof except as defined in the appended claims.

What is claimed is:

1. A power converter for converting direct current power to alternate current power and supplying the alternate current power to a power system, said power converter comprising:

a converter for boosting a voltage of direct current power supplied from a direct current power supply having a ground capacitor;

an inverter for converting the direct current power supplied from said converter into alternate current power, wherein an input and output of said inverter are not insulated;

a switch which is connected to an output terminal of said inverter and opens/closes an output of said power converter by a mechanical contact;

a detector for detecting a ground fault within a shorter time than an operation time of a customer's ground fault interrupter interposed between said power converter and a power system having one grounded line; and a controller for controlling operations of said converter, said inverter, and said switch, wherein when said detector detects a ground fault, said controller changes said switch to an open state, blocks a gate of said inverter, and holds an output voltage of said converter to be higher than a peak value of an alternate current voltage of the power system until at least said switch changes to the open state.

2. The power converter according to claim 1, wherein when a predetermined time elapses after said switch changes to the open state, said controller cancels the gate block, changes said switch to a closed state, and resumes running of said power converter.

3. The power converter according to claim 1, wherein when a predetermined time elapses after said switch changes to the open state, said controller changes said switch to a closed state while holding the output voltage of said converter to be higher than the peak value of the alternate current voltage of the power system, and then gradually increases an output from said inverter from substantially zero.

4. The power converter according to claim 1, wherein said controller outputs a warning when said detector detects a ground fault and/or when said detector successively detects ground faults.

5. The power converter according to claim 1, wherein said controller has a setting unit for setting a ground fault detection condition of said detector.

6. The power converter according to claim 1, wherein said controller sets in said detector a ground fault detection condition corresponding to output power of said inverter.

7. The power converter according to claim 1, wherein said controller sets a ground fault detection condition of said detector on the basis of a current value detected by said detector when said power converter runs.

8. The power converter according to claim 7, wherein said controller has a display for displaying the ground fault detection condition.

9. The power converter according to claim 1, wherein said controller has a memory for recording a ground fault detection result by said detector.

10. The power converter according to claim 1, wherein said detector detects a ground fault by the same method as the customer's ground fault interrupter.

11. The power converter according to claim 1, wherein said detector detects a zero-phase current and a phase difference between the zero-phase current and a ground voltage of each line of the power system, and detects a ground fault on the basis of detected values.

12. The power converter according to claim 1, wherein said detector detects variations in ground voltage of each line of the power system, and detects a ground fault on the basis of a detected value.

13. The power converter according to claim 1, wherein said inverter has switching elements having a full-bridge arrangement.

14. The power converter according to claim 1, wherein the direct current power supply includes a solar battery.

15. A controlling method of a power converter which converts direct current power to alternate current power, supplies the alternate current power to a power system, and comprises a converter for boosting a voltage of direct current power supplied from a direct current power supply having a ground capacitor, an inverter for converting the direct current power supplied from said converter into alternate current power, wherein an input and output of said inverter are not insulated, a switch which is connected to an output terminal of said inverter and opens/closes an output of said power converter by a mechanical contact, and a detector for detecting a ground fault within a shorter time than an operation time of a customer's ground fault interrupter interposed between said power converter and a power system having one grounded line, said method comprising the steps of:

changing said switch to an open state when said detector detects a ground fault;

blocking a gate of said inverter; and holding an output voltage of said converter to be higher than a peak value of an alternate current voltage of the power system until at least said switch changes to the open state.

16. The method according to claim 15, further comprising the step of, when a predetermined time elapses after said switch changes to the open state, canceling the gate block, changing said switch to a closed state, and resuming running of said power converter.

17. The method according to claim 15, further comprising the step of, when a predetermined time elapses after said switch changes to the open state, changing said switch to a closed state while holding the output voltage of said converter to be higher than the peak value of the alternate current voltage of the power system, and then gradually increasing an output from said inverter from substantially zero.

18. The method according to claim 15, further comprising the step of outputting a warning when said detector detects a ground fault and/or when said detector successively detects ground faults.

19. A power generation apparatus for supplying alternate current power to a power system and comprising a direct current power supply having a ground capacitor, and a power converter for converting direct current power into alternate current power, wherein said power converter comprises:

a converter for boosting a voltage of direct current power supplied from the direct current power supply;

an inverter for converting the direct current power supplied from said converter into alternate current power, wherein an input and output of said inverter are not insulated;

a switch which is connected to an output terminal of said inverter and opens/closes an output of said power converter by a mechanical contact;

a detector for detecting a ground fault within a shorter time than an operation time of a customer's ground fault interrupter interposed between said power converter and a power system having one grounded line; and a controller for controlling operations of said converter, said inverter, and said switch, wherein when said detector detects a ground fault, said controller changes said switch to an open state, blocks a gate of said inverter, and holds an output voltage of said converter to be higher than a peak value of an alternate current voltage of the power system until at least said switch changes to the open state.

20. The apparatus according to claim 19, wherein the direct current power supply includes a solar battery.

* * * * *